(12) United States Patent
Bolognesi et al.

(10) Patent No.: US 8,272,586 B2
(45) Date of Patent: Sep. 25, 2012

(54) METHOD FOR DETECTING THE AMOUNT OF GRAINS WITHIN A GRINDING DEVICE

(75) Inventors: Fabio Bolognesi, Bologna (IT);
Riccardo Ziani, Bologna (IT);
Massimiliano Milardi, Crotone (IT)

(73) Assignee: Kononklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/109,133

(22) Filed: May 17, 2011

(65) Prior Publication Data

US 2011/0215178 A1    Sep. 8, 2011

(51) Int. Cl.
*B02C 25/00* (2006.01)
(52) U.S. Cl. ...................... 241/36; 241/261.2
(58) Field of Classification Search ............. 241/33–37, 241/100, 261.2, 261.3
See application file for complete search history.

(56) References Cited

U.S. PATENT DOCUMENTS

| 6,321,506 | B1 | 11/2001 | Rolland |
| 2010/0095852 | A1 | 4/2010 | Remo et al. |

FOREIGN PATENT DOCUMENTS

DE            9005651 U1     7/1990

*Primary Examiner* — Mark Rosenbaum

(57) ABSTRACT

A method for detecting an amount of grains within a container of a rotating grinding member is described, said method comprising the steps of: supplying (FORP1) a first driving torque to the rotating grinding member during a first interval (T1) of a grinding cycle (CM); —having (CTM1OO) a first value indicative of a period of rotation of said member at the first driving torque; supplying (RP2) the rotating grinding member, during a second interval (T2) of said cycle, with a second driving torque lower than the first driving torque; —measuring (CTM50) a second value indicative of the relative period of rotation of said member at the second driving torque, processing (CDTR, CNFR) the first and second values in order to generate information (ALR) indicative of the amount of grains being within the container.

1 Claim, 6 Drawing Sheets

| NMC | ΔTSD |
|---|---|
| 0 – 1000 | ΔTSD1 |
| 1001 – 3000 | ΔTSD2 |
| 3000 – 10000 | ΔTSD3 |
| ... | ... |
| 30001 - 100000 | ΔTSDN |

FIG. 6

METHOD FOR DETECTING THE AMOUNT OF GRAINS WITHIN A GRINDING DEVICE

This is a continuation application of U.S. patent application Ser. No. 12/306,303, filed Dec. 23, 2008.

The present invention relates to devices for grinding food grains or the like, and particularly, but not limited to, devices for grinding coffee beans.

For the purposes of the present invention, by "grain" or "bean" is meant any substantially round-shaped body or particle that can be intended for grinding in order to be powdered. Examples of grains can be seeds, legumes, grains of wheat or coffee beans and other particles, not necessarily food.

With particular reference to coffee grinding, a conventional coffee grinding device, commonly known as the coffee grinder, is usually provided with a container, or hopper, suitable to contain the coffee beans to be ground and rotating grinders that provide to powder the beans.

During grinding, as the coffee beans are decreasing within the hopper, the latter is required to be immediately filled in order to ensure that the coffee grinder operates at rated power, and that a good coffee beverage will be produced. In order to facilitate this hopper-filling operation, it is quite useful to have an indication representative that the coffee beans are running out.

A known coffee machine provides using a doser that is arranged downstream of a conventional coffee grinder, which is suitable to receive the ground coffee powder before the latter is used for producing coffee beverage. This doser is typically provided with a mechanical spring which is released, when the doser results to be filled with coffee powder, thus sending a command signal to the coffee grinder to stop grinding. Furthermore, a control system with which this coffee machine is provided is suitable to assess when this release has not been sensed for a preset period of time and translates this event into information representative of the fact that the coffee powder can no longer reach the top of the doser, and this allows drawing the conclusion that the coffee beans are finished within the hopper. In this case, the detection of the absence/presence of coffee beans is carried out in an indirect manner, by checking the doser for the presence of ground coffee powder. This type of coffee machine has a drawback in the doser overall size and in the extra-cost of both the doser and the detection and control electronic system.

In order to overcome the above-cited drawback, in the so-called semi-automatic coffee machines, the coffee grinder is provided with a sensor for detecting the current draw of the coffee grinder upon operation. Also in this case, a control system associated with the coffee grinder compares the value of said electric power with a threshold or reference value. Typically, a coffee grinder draws an amount of electric power proportionate to the effort made by the latter to grind the coffee, and this effort will tend to decrease as the coffee beans to be ground decrease. Particularly, the drawn current has a lower value than threshold value when the effort of the coffee grinder is minimum (i.e. when the coffee beans are already finished). On the contrary, the drawn current has a higher value than the threshold value when the effort of the coffee grinder is still high because the hopper still contains an acceptable amount of coffee beans.

This second coffee grinder is not very reliable in that the variations in the drawn current cannot be well differentiated in order to be capable of exactly distinguishing the two conditions (absence and presence) of coffee beans. Furthermore, the selection of the threshold value for the drawn current results to be particularly problematic and imprecise in that this electric current depends, for example, on the voltage of the network to which the coffee machine can be connected. In addition, it should be observed that several design parameters, inter alia, the threshold value of the drawn current, which can be set upon manufacture are subjected to, in some cases, deviations and variations that cannot be foreseen but which are discovered only during the operating life of the coffee grinder. In addition, it should be observed that these parameters can be also influenced by the ageing, mainly due to wear and usage conditions, to which a coffee grinder is subjected and which typically varies with each grinding device.

A further disadvantageous aspect is also, in the instant case, the overall size of the sensor detecting the drawn current, which is actually extra-hardware that, even though being of a small size, requires a suitable accommodation space and also entails further fabrication and installation costs.

An object of the present invention is to provide a method for detecting an amount of grains within a container of a grinding device.

A further object of the present invention is to provide a grinding device capable of detecting an amount of grains within a container of the grinding device.

A still further object of the present invention is to provide a computer program for causing a processor to carry out the method for detecting an amount of grains within a container of a grinding device.

The invention will be better understood from the detailed description below of an embodiment thereof, which is given by way of non-limiting example with reference to the annexed figures, in which:

FIG. 1 schematically shows a grinding device;

FIG. 6 shows a table of numerical values that can be used in a further example of the method according to the invention.

An example of grinding device 1 for coffee beans, or more simply, coffee grinder will be now described.

Figure 1:
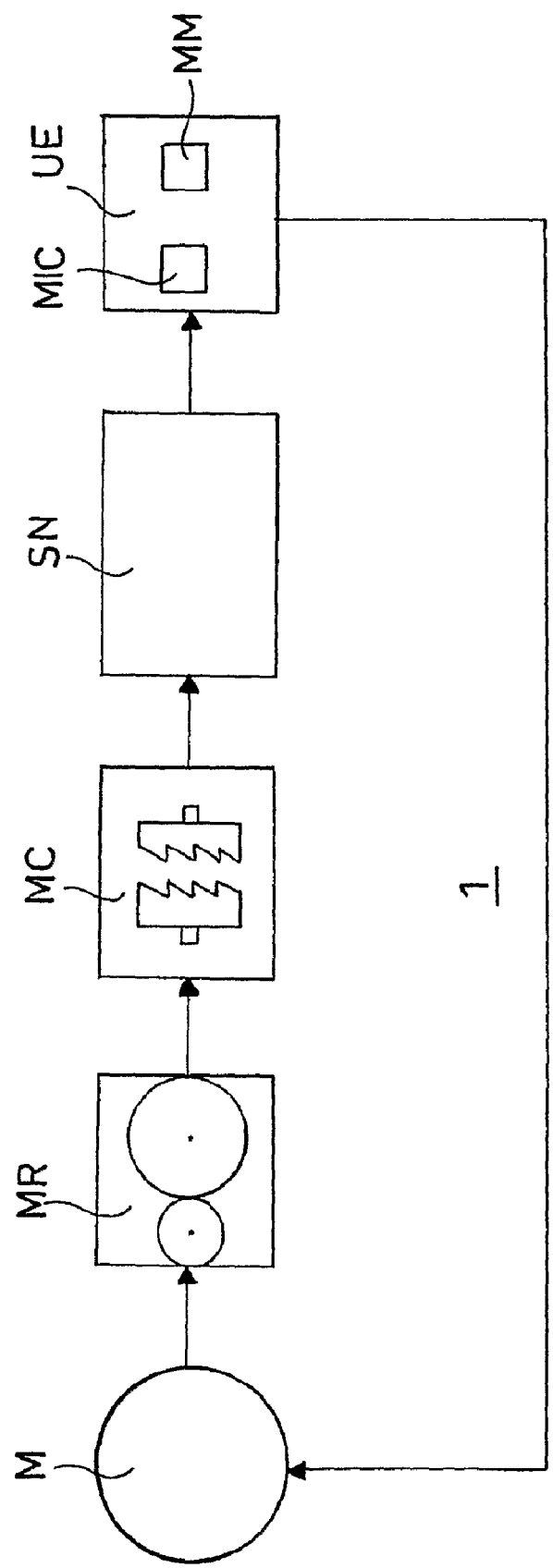

With reference to the diagram in FIG. 1, a coffee grinder 1 comprises an electric motor M provided with a rotating grinding member, for example a set of grinders MC, for powdering coffee beans. Grinders MC, which are known per se, can be conical or circular and are suitable to receive the coffee beans to be powdered coming from a hopper (not shown in the Figure) containing the latter and typically arranged upstream of the two grinders. Typically, the electric motor M is a DC motor that can be electrically powered, preferably at 230 V.

It should be noted that a reduction gear MR can be advantageously interposed between the motor M and the grinders MC. The reduction gear MR, which is known per se, has the function of adjusting the variation in the number of revolutions N of the grinders MC relative to that of the motor, upon variations in the power supplied to the motor M. In fact, being:

K the gear ratio of the reduction gear MR; $\Delta P$ the variation in the power that can be supplied to the electric motor; $\Delta N$ the variation in the number of revolutions N of the motor, the following relationship applies:

$$\frac{\Delta P}{K} = \Delta N \quad (1)$$

The gear ratio K is a constant value greater than 1 and such that to a high variation in the power supplied to the motor (L1P) there corresponds, anyway, a lower variation in the number of revolutions of the motor (L1N).

The coffee grinder 1 further comprises a pair of sensors SN, for example of known Hall-effect sensors, each being associated with one of the grinders MC, for generating a signal, for example, an electric pulse, whenever a grinder has completed a rotation period TR about a reference axis of rotation. Alternatively to the pair of sensors SN, it may be also sufficient to use an individual sensor associated with one of the grinders, or any other known detection means (such as mechanical, optical, electronic sensors, encoders) which is suitable to generate a pulse indicative that the rotation period TR of the rotating grinding element (grinder) has been completed.

The coffee grinder 1 is further provided with an circuit board, conventional per se, comprising a processing unit UE or programmable micro-controller, which includes, in turn, a micro-processor MIC and a data-storage memory MM and on which a management and control program for the coffee grinder can be installed. A user interface is further mounted to the circuit board that can be controlled by the processing unit UE. The functionality and use mode of the user interface will be described below.

The processing unit is operatively associated with the pair of sensors SN, in order to receive and process the electric pulses acquired therefrom, and to the electric motor M, respectively, in order to command and control the rotation of the grinders.

For the purposes of the present invention, by "grain-absent condition", coffee beans in the example described herein, is meant the condition in which insufficient or no grains are provided at the grinders MC, when they are brought to rotate, to achieve a satisfactory grinding.

On the other hand, by "grain-present condition" is meant the condition in which a sufficient amount of coffee beans is provided at the moving grinders MC, in order to achieve a sufficient grinding. Quite probably, the grain-absent condition can be attributed to the hopper being substantial empty, whereas the grain-present condition derives from the fact that the hopper still contains a sufficient amount of the latter such as to ensure a rated power operation of the coffee grinder.

The Applicant has noted that, when the grinders are brought in rotation by the electric motor M for grinding, they adopt an angular rotation speed $\omega=d\zeta/dt$ ($\zeta$ radial direction angle) which is substantially inversely proportional to the amount of coffee beans that is progressively provided at the grinders. Particularly, a first value $\omega pg$ of the grinding angular speed $\omega$ substantially corresponding to the coffee beans-present condition and a second value $\omega ag$ of the grinding angular speed $\omega$ corresponding to the bean-absent condition can be defined. During the grinding, an indication on the amount of coffee beans provided in the coffee grinder, for example the passage from the grain-present condition to the grain-absent condition can be represented by the variation $\Delta\omega$ in the grinding angular speed $\omega$ that can be obtained by the difference between the second value $\omega ag$ and the first value $\omega pg$ cited above ($\Delta\omega=\omega ag-\omega pg$). It appears reasonable that the first value $\omega pg$ results lower than the second value $\omega ag$ and, accordingly, the variation $\Delta\omega$ will presumably greater than zero.

In order to operate the grinders MC, it is required to supply the electric motor M with a driving torque corresponding to a work power PF equal to, as it is known, a percentage of the rated power PN that can be delivered to the coffee grinder. The Applicant points out that, with the same amount of coffee beans, as compared with the case where a first work power P1 is supplied to the electric motor that is for example 100% rated power, when a second work power P2 lower than P1 is supplied to the motor, such as 50% rated power, the rotation angular speed $\omega$ is reduced, and consequently, the rotation period TR of the individual grinder will increase.

Furthermore, the Applicant observes that when the grinders MC work at the first power P1, they rotate with an almost constant rotation speed upon a variation in the amount of grains. In other words, when the grinders MC work at a higher power, they are little sensitive to the amount of grains on which they operate. On the other hand, when the grinders MC work at the second power P2, they rotate at a rotation speed which is more affected by the actual amount of grains on which the grinders operate.

This different sensitiveness of the grinders MC to the presence or absence of coffee beans is due to a different balance between the "resisting torque" (i.e. the torque exerted by the coffee beans on the grinders) and the "driving torque or available torque" (i.e. the torque supplied by the motor M to the grinders MC) which occurs when working at the first power P1 or second power P2.

In fact, when the coffee grinder 1 is operated for grinding at the first power P1, an available torque is obtained which is so higher than the resisting torque that the grinders MC have a rotation angular speed that is almost the same both in the presence and in the absence of coffee beans.

When working at the second power P2, the resisting torque becomes substantially comparable with the available torque, and thus the absence of coffee beans causes a rotation speed of the grinders which results to be appreciably higher than the rotation speed occurring in the presence of coffee.

In fact, the Applicant has observed that when working at the second power P2, a condition occurs in which the balance is unstable and strongly depends on the presence or absence of coffee beans at the grinders.

The fact that the angular speed mainly depends on the presence or absence of coffee when working at the second power P2 is, advantageously, also facilitated by the action of the reduction gear MR. In fact, the variation in the number of revolutions of the grinders $\Delta N$ is lower than the corresponding power variation $\Delta P=P1-P2$ according to the gear ratio K.

This allows the Applicant to conclude that the presence or absence of coffee can be distinguished on the basis of the grinding angular speed $\omega$ of the grinders MC in the two work conditions, i.e. at the first power P1 and second power P2.

The detection of the grinding angular speed $\omega$ can occur in an indirect manner, via the pair of sensors SN that are capable of generating an electric pulse indicating that a respective rotation period TR has been completed by the grinders MC. Thereby, a train of electric pulses can be generated upon grinding, such as a square wave, in which the leading edges and trailing edges are generated by the pair of sensors SN.

Figure 2:
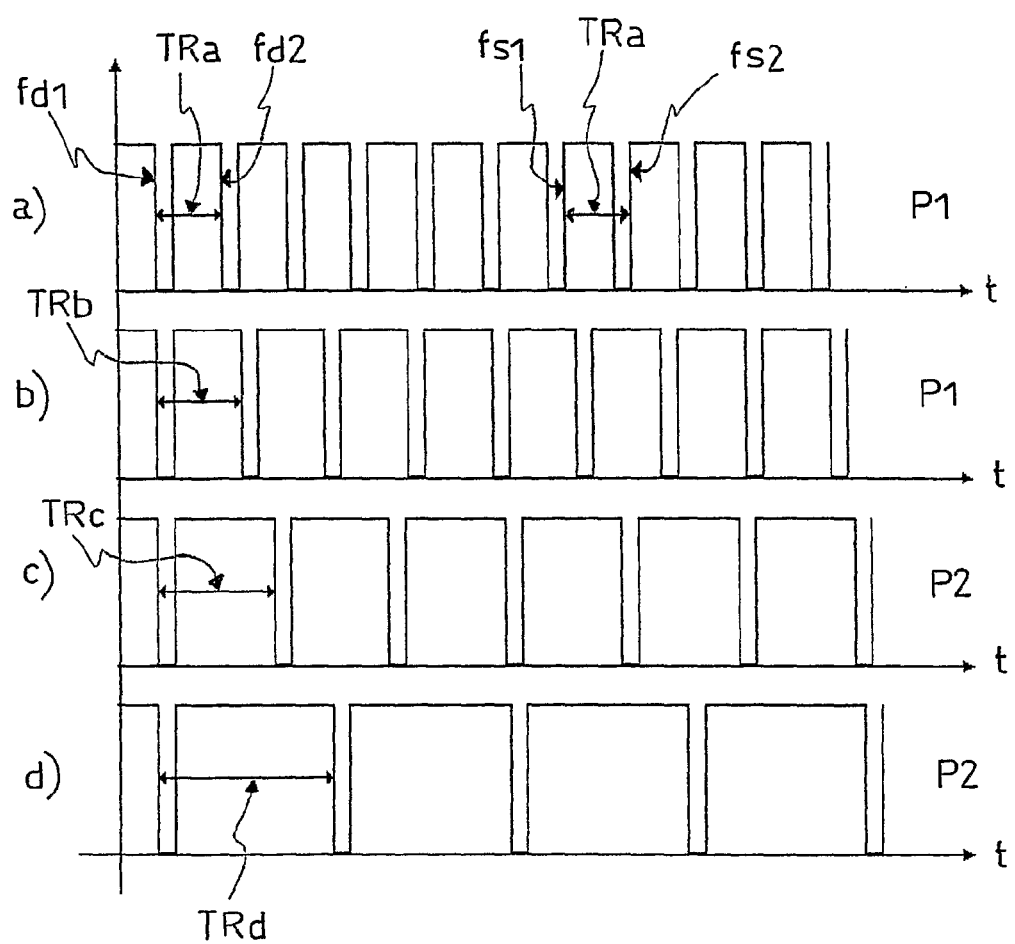
FIGS. 2 and 3b show examples of waveforms representative of the rotation speed of a grinding member that can be processed by means of a detection method according to an example of the present invention.

With reference to FIG. 2, and particularly the waveform indicated with a), the pulse train represented herein has an amplitude equal to a voltage V and a rotation period TRa being defined by the distance between a first fd1 and a second fd2 trailing edge of the waveform a) or by the distance between a first fs1 and second fs2 leading edge of the same waveform. The detection of the rotation period TRa allows having an indication representative of the grinding angular speed ω.

In FIG. 2, four test examples are shown of waveforms (a-d) generated by the pair of sensors SN upon grinding. Particularly, the waveform a), with period TRa, relates to the case where a driving torque at the first power P1 is supplied to the electric motor M (which power is suitable to carry out a satisfying grinding) and in the coffee bean-absent condition.

The waveform b), with period TRb, relates to the case where a driving torque at first power P1 is supplied to the electric motor M, and in the coffee bean-present condition.

The waveform c), with period TRc, relates to the case where a driving torque at second power P2 is supplied to the electric motor M (equal to a value suitable for distinguishing between the presence/absence of grains) and in the coffee bean-absent condition.

The waveform d), with period TRd, relates to the case where a driving torque at second power P2 is supplied to the electric motor M, and in the coffee bean-present condition.

Comparing the waveform a) to the waveform b), and the waveform c) to the waveform d), respectively, it can be observed that the difference between the period TRa and period TRb is much lower than the difference between the period TRc and the first period TRd. What has been pointed out confirms that, when a driving torque is supplied to the electric motor M with a work power equal to 100% rated power, the variation Δω in the rotation angular speed upon a variation in the grain amount is nearly negligible, i.e. it does not allow distinguishing between the coffee-absent condition and coffee-present condition in an easy manner. On the contrary, when a driving torque corresponding to a substantially reduced power is supplied to the electric motor M, such as equal to 50% rated power, the variation Δω in the angular speed of the grinders results so high as to allow distinguishing between the grain-present and grain-absent conditions.

Figure 3A:
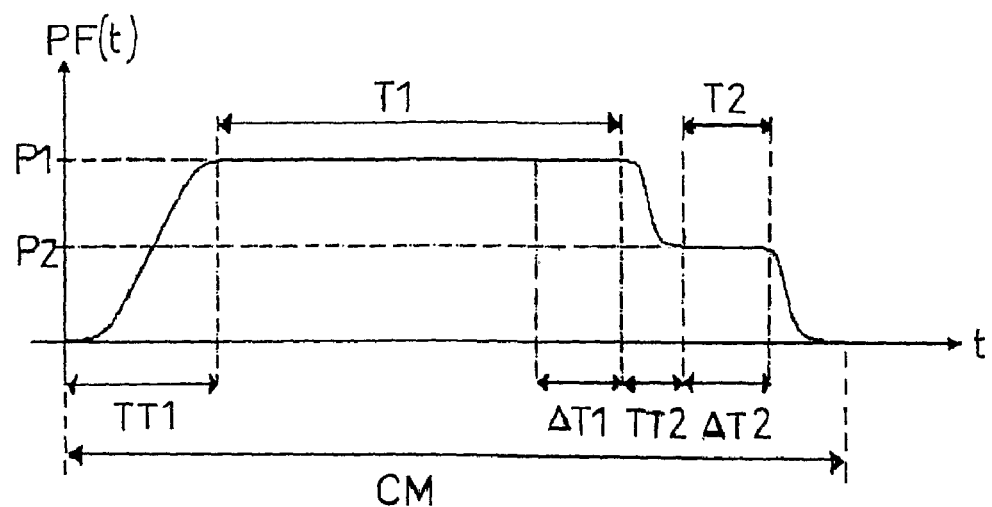
FIG. 3a shows a diagram of the work power that can be provided to the grinding device with the detection method according to the example of the invention.
Figure 3B:
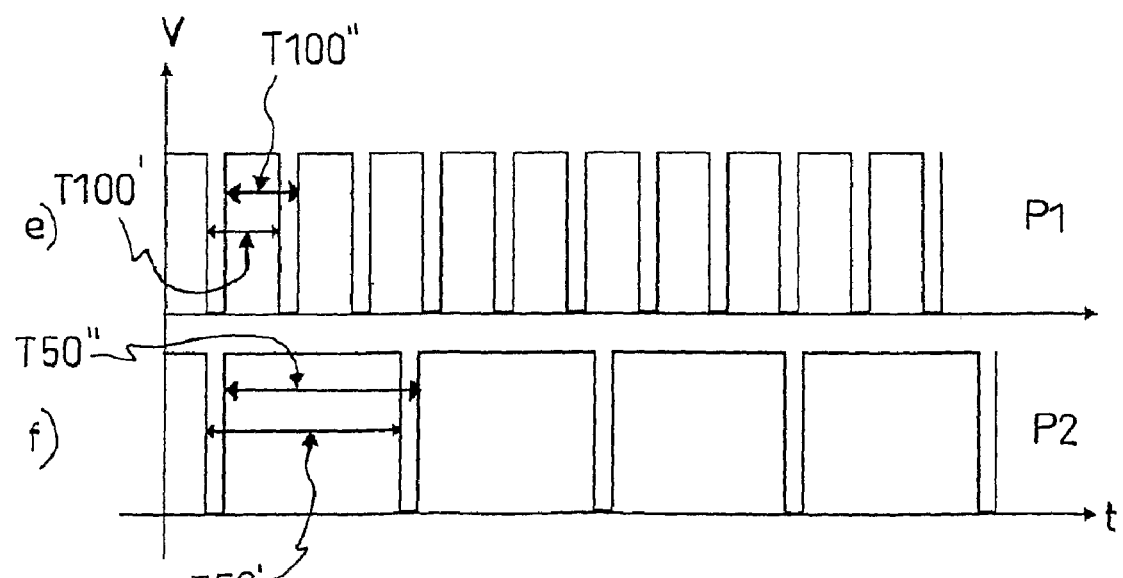
Figure 4:
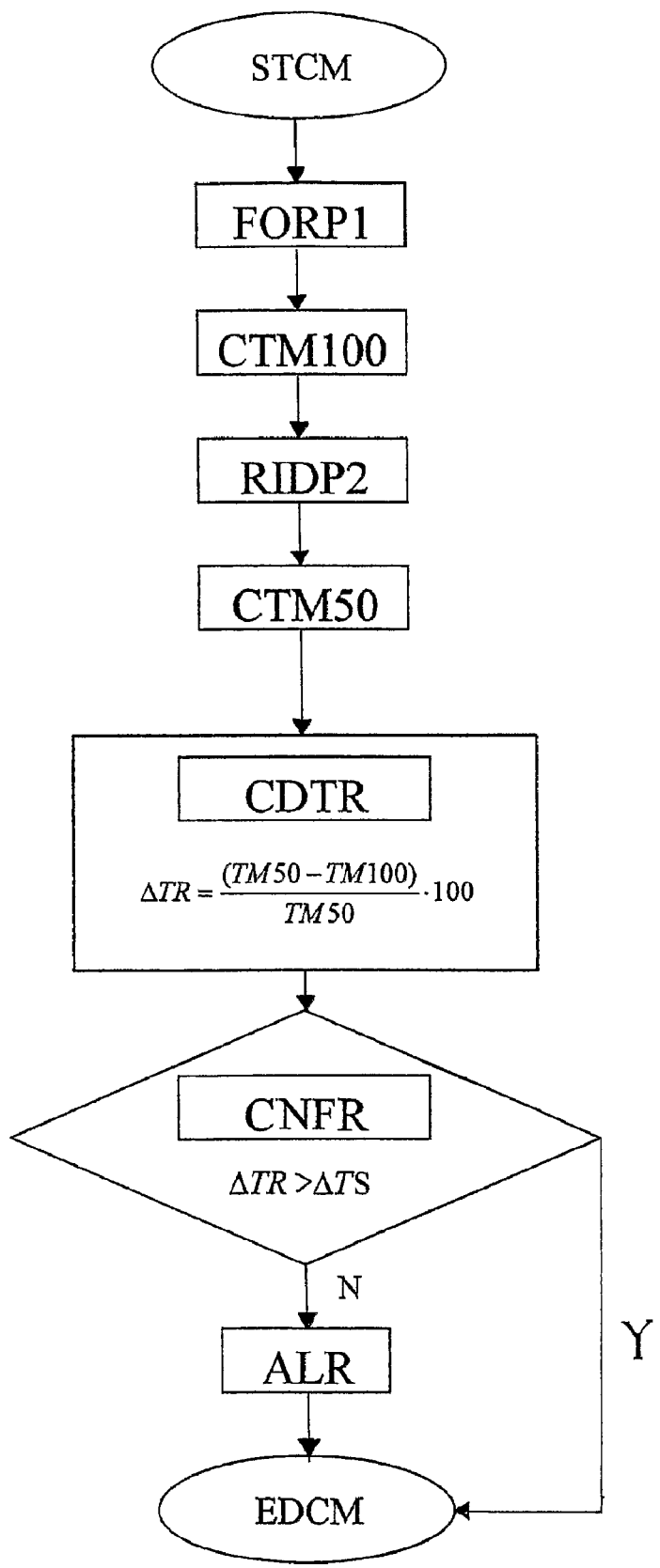
FIG. 4 shows a flow chart of several steps of the detection method in accordance with the example of the present invention.

With reference to FIGS. 3a, 3b and 4, an example of method for detecting an amount of grains to be used with the coffee grinder 1 will be now described.

In FIG. 3a a diagram is shown, which represents an exemplary course of the work power PF that can be provided to the motor as a function of time, and precisely, during a grinding cycle CM. particularly, the work power PF is expressed in terms of percentage of a rated power PN deliverable to motor M.

By "grinding cycle" is meant the time interval in which the coffee grinder is operated for grinding an amount of coffee beans sufficient to obtain the dose required for preparing a coffee.

With reference to FIG. 4, the example of the method according to the 'invention described herein begins with a symbolic starting step STCM.

Subsequently, during a first interval T1 of the grinding cycle CM, the processing unit UE provides the grinding member with a first driving torque CM1 (step FORP1). Particularly, the processing unit sends a suitable command to the electric motor M in order to supply the motor with the first work power value P1 equal to, for example, 100% of deliverable rated power PN.

In other cases, for example depending on the type of coffee grinder, it can be sufficient to bring the motor to a work power equal to, for example, 90% or even 80% rated power.

With reference to FIG. 3a, the passage from the work power PF from the zero value to the first value P1 occurs in a transient period TT1 in which an up-ramp takes place in order to allow the work power PF to increase in a substantially gradual manner until when the first value P1 is reached, in the example equal to 100% rated power PN deliverable to the motor. The processing unit UE controls the electric motor M such as to keep the work power PF equal to the first value P1, preferably, throughout the first interval T1 of the grinding cycle. The Applicant observes that, at the end of the transient period TT1 and throughout the first interval T1 the angular speed ω of the grinders stabilizes at an almost constant value, and thus also the rotation period TR of the same (time lapse between two electric pulses that can be generated from the pair of sensors SN) remains substantially unchanged.

With reference to the example described herein at a first portion ΔT1 of the first interval T1, for example at the end portion thereof, the processing unit UE advantageously acquires a first waveform e) (shown in FIG. 3b) that is generated by the pair of sensors SN within the first interval ΔT1. Particularly, the waveform e) has: a first pair of pulses with trailing edges delayed relative to each other by a first period T100'; a second pair of sequential pulses with leading edges delayed relative to each other by a second period T100", etc. The processing unit UE acquires said periods (T100' T100", . . . ) that can be detected within the first portion ΔT1 of the first interval T1 and proceeds to calculate a first mean value TM100 thereof (step CTM100, for example, by means of arithmetic mean), based on two or more measured periods. The first mean value TM100 results indicative of a respective first period of rotation of the grinders when the coffee grinder is supplied with the first driving torque CM1.

Subsequently, during a second interval T2 of the grinding cycle CM, the processing unit UE supplies the grinders with a second driving torque CM2 lower than the first driving torque CM1 (step RP2). In order to obtain the variation in the driving torque, the processing unit UE commands the reduction in the work power PF supplied to the electric motor M from the first work power value P1 to the second work power value P2 being substantially preferably equal to 50% rated power. It should be noted that said second work power value P2 can also be, for example, equal to 60% or 70% rated power or other values suitable to the purpose.

As shown in the diagram in FIG. 3a, the reduction in the work power PF causes a second transient period TT2 that is due, also in this case, to a down-ramp required for passing from the first P1 to second P2 work power value. The processing unit DE thus holds the work power PF equal to the second value P2 throughout a second interval T2 and, preferably, until the end of the grinding cycle CM. The second interval T2 results to be much lower than the first interval T1. The Applicant points out that this advantageously allows having a coffee grinder operating at rated power (first power value P1 first driving torque CM1) almost for the entire (first interval T1) grinding cycle CM and operation at reduced power (second value P2-second driving torque CM2) for a much shorter interval relative to the grinding cycle (second interval T2). Numerical examples of possible durations of the intervals T1 and T2 and grinding cycle CM will be set forth below.

During a second portion ΔT2 of the second interval T2, the processing unit DE acquires a second waveform f) (shown in FIG. 3b) generated by the pair of sensors SN. It should be noted that, in the example described above, the second portion ΔT2 substantially corresponds to the 5 second period T2. In greater detail, the waveform f) has, for example, a respective first pair of sequential pulses with trailing edges delayed relative to each other by a respective first period T50', a respective second pair of sequential pulses with leading edges delayed relative to each other by a respective second period T50", etc. What has been stated for the first two pairs of sequential pulses can be expressed for all other pairs of pulses forming the waveform f). Even in this case, the processing unit DE proceeds to calculate a second mean value TM50 (step CTM50) obtained, for example, by the arithmetic mean of two or more periods detectable within the second portion ΔT2 of the second interval T2. The processing unit thus measures the second mean value TM50 indicative of a respective second period of rotation of the grinders when the second driving torque CM2 is supplied to the coffee grinder.

At this stage, the processing unit UE starts to process the first TMI00 and second TM50 mean values to generate information indicative of the amount of grains within the container.

For example, the processing unit DE implements the formula below (step CDTR):

$$\Delta TR = \frac{(TM50 - TM100)}{TM50} \cdot 100 \quad (2)$$

As may be seen in the relationship (2), the processing unit starts assessing the difference between the first TMI00 and second TM50 values (numerator) in order to generate a quantity ΔTR representative of a deviation of the period of rotation in the work condition at the first power P1 relative to the work condition at the second power P2. Particularly, the quantity ΔTR is a percentage variation relating to the second mean value TM50 (denominator) of the mean period between sequential pulses generated by the pair of sensors SN when the coffee grinder is supplied with the first driving torque CM1 and subsequently the second driving torque CM2.

The processing unit DE then starts comparing (step CNFR) the quantity ΔTR with a predetermined threshold value ΔTS stored in the memory MM. Particularly, the threshold value ΔTS is suitable to distinguish the coffee bean-present condition from the coffee bean-absent condition.

Particularly, the Applicant states that the threshold value ΔTS is set upon design of the coffee grinder, and more particularly, selected within an interval of values ranging between a duly calculated upper limit value ΔTP and lower limit value ΔTA.

For example, the upper limit value ΔTP is calculated by the processing unit UE by applying the (2) in the coffee bean-present condition:

$$\Delta TP = \frac{(TP50 - TP100)}{TP50} \cdot 100 \quad (3)$$

The value TAIOO is the mean value of the period between two sequential pulses generated by the pair of sensors SN when the, first work power PI is supplied to the motor. The value TPIOO is calculated based to electric pulses detected in the first portion ~T1 of the first interval T1 of the grinding cycle CM.

The value TP50 is the mean value of the period between two sequential pulses generated by the pair of sensors SN when the motor is supplied with the second work power P2. The value TP50 is calculated based on pulses detected by the sensors in the second portion ΔT2 of the second interval T2 of the grinding cycle CM.

The lower limit value ΔTA is obtained by applying the (2) in the coffee bean-absent condition:

$$\Delta TA = \frac{(TA50 - TA100)}{TA50} \cdot 100 \quad (4)$$

The value TPIOO is the mean value of the period between two sequential pulses generated by the pair of sensors SN when the first work power is supplied to the motor P1. Also in this case, the calculation of TA100 is carried out based on pulses generated during the first portion ΔT1 of the first interval T1 of the grinding cycle CM.

The value TA50 is, instead, the mean value of the period between two sequential pulses generated by the pair of sensors SN when the motor is provided with the second work power P2. The value TA100 is calculated based on pulses detected in the second portion ΔT2 of the second interval T2 of the grinding cycle CM.

As stated above, the threshold value is suitably selected such as to comply with the following condition:
ΔTA<ΔTS<ΔTP.

When the quantity ΔTR is lower than the threshold value ΔTS, the coffee grinder is in the substantial coffee bean-absent condition (option N in the chart in FIG. 4). In this case, the processing unit UE signals (step ALR) the state of substantial coffee bean-absent state via a user interface provided on the coffee grinder. Particularly, the processing unit UE activates, via said interface, a signalling device for the user, such as a display being operatively associated with said interface on which a warning message appears, like "NO COFFEE". Alternatively to or in combination with the display, other suitable signalling devices for the user are a light alarm, for example a red Led that lights up when there is no coffee, or a sound alarm, for example a buzzer, capable of emitting a sound when there are no coffee beans.

In the case where the quantity ΔTR is higher than the threshold value ΔTS, the coffee grinder is in the coffee bean-present condition (option Y in the diagram in FIG. 4) and the processing unit UE does not provide to send any alarm signal.

It should be noted that at the end of the second interval T2 the grinding cycle CM can be considered finished and the processing unit UE stops the supply of work power PF to the electric motor M gradually passing from the second work power value P2 to a substantially zero value (step EDCM).

As relates to the duration of the time intervals described above, typically, the grinding cycle CM has a duration of 8-10 seconds corresponding to about a number of pulses ranging between 90 and 120. The second interval T2 preferably has a duration of several milliseconds (about 7-8 pulses). Particularly, the rather reduced duration of the second interval (a few milliseconds) relative to the first interval T1 (slightly less than 8-10 seconds) allows the coffee grinder to work, during the grinding cycle CM, at a substantially reduced power only for a short time, which advantageously does not affect the quality of grinding and the obtainment of a good coffee beverage.

Furthermore, in the example described herein, the second interval T2 is arranged after the first interval T1 and corresponds to an end interval of the grinding cycle CM. This situation is preferred, in that, considering that a reduction in the work power supplied to the coffee grinder can result irritating to hear, it allows to disguise the work power decrease required for carrying out the method of the invention like the normal power decrease occurring at the end of the grinding cycle to turn off the coffee grinder.

Furthermore, in alternative embodiments of the method according to the invention, the second interval T2 can also not be necessarily sequential to the first interval T1, or during a grinding cycle, more intervals (similar to the first interval T1) may occur in which the coffee grinder is brought to the first power value PI and also more intervals (similar to the second interval T2) may occur in which the coffee grinder is brought to work at the second work power value P2.

Figure 5A:
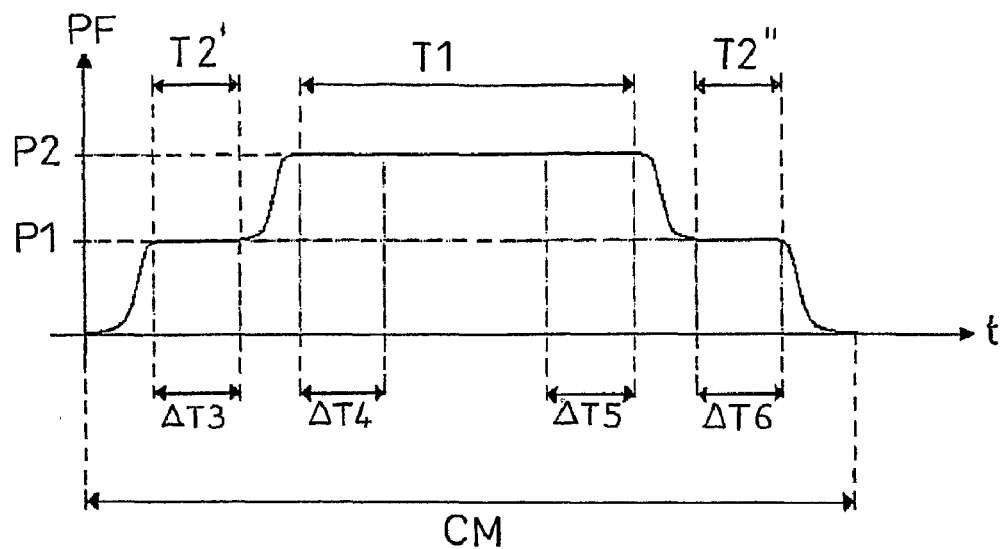
FIGS. 5a and 5b show respective power diagrams that can be provided to the grinding device according to alternative embodiments of the method according to the invention.

With reference to FIG. 5a, in a further example of the method according to the invention, the second driving torque CM2 can be supplied to the grinding member by applying the second power value P2 for the respective intervals T2' and T2" that are arranged at the ends of the grinding cycle CM, respectively, and separated from each other by the first interval T1 during which the grinding member is supplied with the first driving torque CM1, corresponding to the first power value P1.

The division of the grinding cycle into these time intervals allows proceeding to the detection of the amount of coffee beans at different points of the grinding cycle, such as at the beginning and at the end of the latter. Particularly, the processing unit UE carries out once again the process steps described above with reference to the flow chart in FIG. 4. In this example, in the relationship (2) appears the second mean value TM50 calculated on the basis of pulses generated by the pair of sensors within a third portion ΔT3, substantially corresponding to the interval T2', when the second driving torque is applied to the motor CM2. Furthermore, in (2), the first mean value TM100 is used, which is calculated on the basis of pulses generated by the sensors in a fourth portion ΔT4 substantially placed at the beginning of the first interval T1 of the grinding cycle. Thereby, it is possible to have an indication representative of the amount of coffee beans at the very beginning of the grinding cycle.

In this example, the processing unit carries out once again the method according to the invention (FIG. 4) even at the end of the grinding cycle. particularly, in (2) appears a first mean value TMIOO calculated with reference to a fifth portion ΔT5 of the first interval T1, which is substantially placed at the end of the latter and corresponding to the condition of first driving torque CMI supplied to the coffee grinder. Furthermore, in (2) appears a second mean value TM50 calculated with reference to a sixth portion ΔT6 corresponding to the interval T2" placed at the end of the grinding cycle. The processing unit UE is thus capable of generating information representative of the amount of grains also at the end of the grinding cycle.

This embodiment of the method according to the invention, combining the detection at the beginning and at the end of the grinding cycle, allows advantageously increasing the possibility of detecting the amount of coffee in the most correct manner possible, and signalling even more immediately when the latter is finished.

Figure 5B:
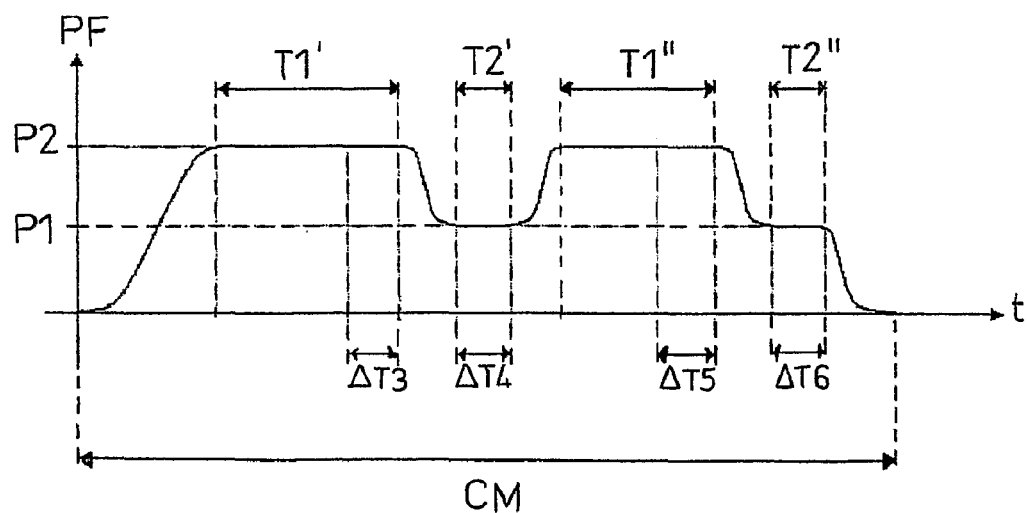

In FIG. 5b is shown another example of the method according to the invention.

The grinding member, during a grinding cycle CM is first brought to the first power value P1 (100% rated power) to supply the first driving torque CM1 for a respective first interval T1'. Subsequently, for a respective second interval T2', the grinding member is supplied with the second driving torque CM2 (second power value P2-50% rated power) and then, for a further first interval T1" the motor is brought back to the first power value P1. The grinding cycle ends with a further second interval T2" in which the grinding member is supplied once again with the second driving torque CM2 corresponding to the second work power value P2.

What has been stated in the above example of method (FIG. 5a) can be also repeated with the division of the grinding cycle as shown above (FIG. 5b). In this case, the (2) is implemented, for the first time, with first and second mean values calculated with reference to the third portion ΔT3, situated in a final portion of the respective first interval T1', and the fourth portion ΔT4 situated at the respective second interval T2'. The processing unit thus implements the (2) for the second time with first and second mean values calculated with reference to the fifth portion ΔTS situated at the end of the further first interval T1" and to the sixth portion ΔT6 situated at the further second interval T2".

Also this embodiment of the method according to the invention advantageously allows increasing the possibility of detecting the amount of coffee in the most correct and precise manner possible, and outputting a signal when the latter is finished.

Generally, the selection of the number and frequency of intervals of the grinding cycle at which the second torque is to be supplied to the grinding member depend on the whole duration of the grinding cycle and on the desired precision of detection.

In a further alternative embodiment of the invention, the detection method according to the invention can provide that the first value TM100, indicative of the period of rotation of the grinding member at the first driving torque CM1 and not particularly sensitive to the presence/absence of coffee, is not detected during the grinding cycle CM by is defined upon design of the coffee grinder and stored in the memory MM associated with the processing unit UE. On this account, the method according to the invention can be said to comprise a step of planing a first mean value TM100 indicative of the period of rotation of the grinding member at the first driving torque.

The preferred relationship (2) in the examples of the method according to the invention that have been considered herein above can also be replaced with other mathematic formulae that carry out another type of normalization, or that, for example do not obtain values expressed as a percentage.

In a further alternative embodiment, considering the quantities already used in (2), the following relationships applies as an alternative to relationship (2):

$$\Delta TR = \frac{(TM50 - TM100)}{TM50} \cdot 100 \qquad (5)$$

As may be seen, relative to (2), in the relationship (5) the difference, at the numerator, between the second TM50 and the first TM100 mean values indicative of the period of rotation is related, at the denominator, to the first mean value TM100 and not the second mean value TM50. Practically, in (5), the percent variation is referred to the first mean value TM100.

In another embodiment, in place of (2) or (3), considering the same quantities as in (2), the following can be also written:

$$\Delta TR = \frac{(TM50 - TM100)}{TM50} \cdot K' \qquad (6)$$

In this case, the difference between the first TMSO and second TM100 mean values, reported at the denominator to the second mean value TMSO, is multiplied by a constant K' (for example of value 1, 10, 50 or 1000 or other value determinable by those skilled in the art upon design based on the mechanical characteristics of the apparatus). Relative to (2) or (5), the quantity ΔTR is not, accordingly, a percentage variation.

The selection of a mathematic relationship over another between (2), (5) and (6) depends, for example, on the calculation power of the microprocessor mounted to the circuit board and on the specific design tolerances of the grinding device.

The example of detection method described herein can be also used outside the field of coffee grinders, i.e. it can be used in any grinding device for grains or beans of food or the like.

As relates to the definition of the preset threshold value ΔTS, the Applicant notes that it is possible to define a dynamic threshold value ATSD, i.e. capable of varying during the operating life of the coffee grinder, which is calculated, for example, based on the number of grinding cycles that have been carried out. In greater detail, upon the design of the coffee grinder, it is possible to define, in the mode described above for the threshold value ΔTS, more threshold values, each of which to be attributed to a range of values corresponding to the grinding cycles that have been carried out by the coffee grinder.

With reference to FIG. 6, the table reported herein has a first column showing the number of grinding cycles NCM of the coffee grinder and a second column showing the respective dynamic threshold value ΔTSD. In the first line of the table, a first range of values of grinding cycles (for example, 0-1000) is associated with a respective dynamic threshold value (for example, ΔTSD1). In the second line of the table, the association is shown between a second range of values of grinding cycles (for example, 1001-3000) and a second dynamic threshold value (for example, ΔTSD2) and the like, for all the other lines in the table. The table in FIG. 6 is thus built upon design of the coffee grinder in consideration of the wear and ageing of the latter. During the operating life of a coffee grinder, the threshold value ΔTS is subjected to variations that can make non-optimum the detection method, which is based on the use of an individual threshold value.

It should be noted that, in order to implement this variant embodiment of the method according to the invention, said table requires to be stored in the memory MM and the processing unit to be provided with a counter of the grinding cycles of coffee grinder.

From the point of view of the method according to the invention, the processing unit, after the percent quantity ΔTR has been calculated (step CDTR), acquires from the counter the number of grinding cycles NMC that have been carried out by the coffee grinder and starts querying the table until when the corresponding dynamic threshold value ΔTSD is determined.

The use of the table in FIG. 6 by the processing unit UE advantageously allows to have a more precise detection of the amount of grains, and capable of dynamically taking into account the normal performance variations to which the coffee grinder is subjected due to ageing.

As may be seen, the object of the invention is fully achieved, in that the example of detection method described herein allows obtaining a precise assessment of the absence or presence of grains to be ground and can avoid providing the addition of new hardware, but merely the sui table programming of circuit cards with which a conventional grinding device is already provided.

For example, it should be observed that the pair of Hall-effect sensors are usually already used for detecting the period of rotation of the grinding member as information representative of the amount and fineness of the ground coffee.

Furthermore, the above-cited counters are already comprises within the microprocessor, which, as it is known, is provided with so-called timers and conventional integrated counters.

It should be further noted that, for example, the method described herein implements rather a simple mathematic relationship (2), (5) or (6), and in which the processing times with a conventional microprocessor are minimum relative to the duration of a grinding cycle. Also the subsequent steps of comparison and querying of table in FIG. 6 can be economically implemented by a standard microprocessor.

Finally, the detection method according to the invention is not based on the analysis and detection of inherent electric quantities of the coffee grinder, such as for example the current draw, but on quantities, such as percent variations, related to the rotation of the grinding member and mostly depending on the present amount of coffee in the coffee grinder, and not on the type of coffee grinder. In greater detail, the use of a mathematic relationship of the type (2), (5) or (6) that establishes a relation between detected quantities (TM50 and TM100) makes the method according to the invention substantially independent on the type and physical configuration (motor, grinding member, power supply voltage) of the coffee grinder.

The invention claimed is:

1. A grinding device comprising:
   a rotating grinding member;
   an electric motor operatively associated with said rotating grinding member and suitable to move said rotating grinding member; and
   a container arranged upstream of said rotating grinding member for containing grains to be powdered during a grinding cycle,
characterized in that said electric motor is controllable to supply the rotating grinding member with at least two different driving torque values, and said grinding device further comprises:
   a detector for detecting a period of rotation of the rotating grinding member, said detector being operatively associated with said rotating grinding member; and
   a processing and command unit connected to the detector and the electric motor,
   wherein the processing and command unit:
   controls the electric motor to supply the rotating grinding member with a first driving torque value during a first interval of a grinding cycle;
   uses the detector to detect a first value indicative of a period of rotation of said rotating grinding member being driven by the first driving torque value;
   controls the electric motor to supply the rotating grinding member, during a second interval of said grinding cycle, with a second driving torque value, said second driving torque value being less than the first driving torque value;
   uses the detector to detect a second value indicative of a period of rotation of said rotating grinding member being driven by said second driving torque; and
   processes the first value and the second value to generate information indicative of an amount of the grains within the container.

* * * * *